E. B. KILLEN.
WHEEL.
APPLICATION FILED JAN. 30, 1914.
1,257,489.
Patented Feb. 26, 1918.
2 SHEETS—SHEET 1.
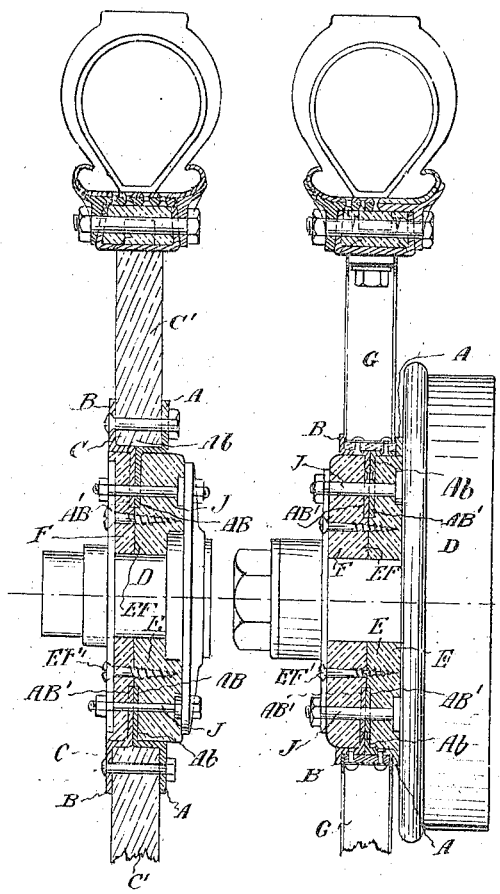

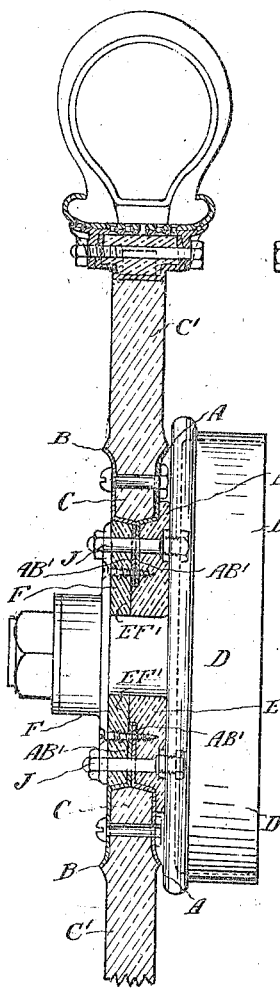
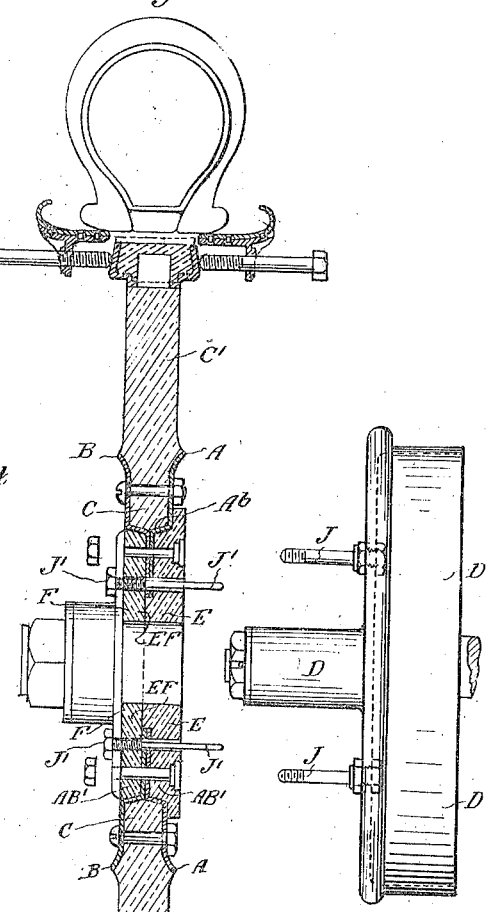

UNITED STATES PATENT OFFICE.

EDWARD BRICE KILLEN, OF LONDON, ENGLAND.

WHEEL.

1,257,489.	Specification of Letters Patent.	Patented Feb. 26, 1918.

Application filed January 30, 1914. Serial No. 815,451.

*To all whom it may concern:*

Be it known that I, EDWARD BRICE KILLEN, of 27 Queen Victoria street, London, England, engineer, have invented certain new and useful Imrovements in Wheels, of which the following is a specification.

In accordance with the methods at present employed in the construction of the wheels of automobiles and other road vehicles, and by reason of the widely varying conditions as to dimensions, proportions, etc., imposed by the different designs of hubs, gears, drums, etc., used in the many various makes of chassis, practically all wooden wheels have to be specially built to suit the particular hubs and gears of the chassis used, and no wooden or other wheel is at present manufactured which can be easily made to take or suit the many dimensions and shapes of hubs and gears now manufactured and be used for either front or back wheels or for a chassis requiring dished or undished wheels.

The present invention, therefore, has for its principal object the provision of a standardized wheel composed of interchangeable parts; the construction being such that, by properly selecting and combining said parts, a wheel capable of meeting all of the requirements of substantially any vehicle can be built up at minimum labor and expense.

More particular objects of the invention are the provision of a wheel construction employing a central portion or member composed of interchangeable assembled parts, and to which the feet or inner ends of the spokes are rigidly secured, said central portion or member being separate from and detachably connected to the hub proper, whereby said central portion or member may be so built up as to cause the wheel, as a whole, to conform to the requirements imposed by any given hub, by the gear, drum, or other part carried thereby, and by the position of said hub in the chassis, and whereby the wheel may be removed from the vehicle without removing the hub or parts connected therewith and without in any way disassembling the wheel, loosening the spokes, or disturbing its truly circular form.

The foregoing and other objects of the invention, together with means whereby the same may be carried into effect, will best be understood from the following description of certain illustrative forms or embodiments thereof shown in the following drawings, in which:—

Figure 1 is a vertical section of the greater portion of a wheel constructed in accordance with the invention.

Figs. 2 and 3 are similar views showing modified constructions.

Fig. 4 is a view, similar to Fig. 3, of the form of the invention illustrated in the latter figure, showing the wheel detached from the hub proper.

With reference to the drawings and in accordance with my improvements, this invention enables wheels to be easily and cheaply manufactured in large quantities at a low cost and when standardized in shape and dimensions allows the many various hubs, drums and gears to be easily fitted to the same standardized design of wheel without weakening, rebuilding or injuring the wheel itself, and the required clearance may always be obtained between my standardized wheel and the chassis, whether the wheels previously used on the chassis were dished or undished. Besides the above advantages, my invention enables practically all wooden wheels to be now built extra strong laterally as well as perpendicularly and capable of being made easily detachable without requiring to remove the hub from its axle. This invention keeps the feet of all wooden spokes tied and locked together at the wheel's center, when the wheel is detached from its hub, see Fig. 4, making said center the equivalent of a solid indistortable center, and yet does not prevent a broken spoke from being easily renewed and it enables the spokes to be easily tightened up if they ever become slack without ever cracking or interfering with the truly circular felly because the spokes may be tightened up by suitable wedges at the wheel's center.

My construction is as follows:—

Instead of building say a wooden wheel having the feet or inner ends of its spokes secured together by means of a metal hub, I may build my wheel so that the feet of the spokes are keyed, tied and locked in position by means of two suitable metal retaining dishes A and B, which two metal dishes, when attached in position with the feet C, of the spokes $C^1$ between them, hold all the feet of the spokes suitably tied and locked together at the wheel's center without depending on the hub D of the wheel to keep the feet locked in position. These back and front metal retaining dishes may be fitted to the back and front of a wooden wheel, and be bolted to each other making practically a unitary retaining metal center A b, for my wheel capable of taking a wood center and enabling the wheel to be easily fitted to and quickly removed from practically any hub innumerable times without interfering with the rigidity of the feet C of the spokes C¹.

Each metal dish may have a hole cut out of its center part large enough to allow the largest existing hub to pass through it. The two metal dishes having been suitably bolted or clamped together through the feet of the spokes by means of bolts and nuts, each dish (with the hole in its center) has then a suitable inner flange A B'. Within the recesses of the dishes A and B are located filler pieces E and F, respectively, preferably of wood or other non-metallic material, conforming in configuration to said recesses and secured together, as by screws E F', to constitute a substantially unitary wood center E F in which is embedded the flange A B'. Said center member E F is provided with a central opening of a suitable size to receive the hub D which is preferably detachably secured thereto as by bolts J, J'. This wood center is capable of being easily shaped and renewed when required to suit all dimensions of hubs and gears and enables a hole of suitable shape and dimensions to be easily turned out to take the hub or hub shell to be attached without in any way weakening my standardized wheel, and when a larger hub or hub shell is required to be fitted to my standardized wheel, a larger hole may be easily turned out of my wood center or when a smaller hub is fitted the wood center may be easily renewed and the wood turned out to take the smaller hub or hub shell and the rigidly fixed hub bolts when used preferably pass through my wood center instead of through the inner ends of the spokes, thereby enabling the wheel and hub to be separated, as shown in Fig. 4, permitting the removal of the wheel without removing the hub and without loosening the spokes.

The thickness of the filler members or blocks E and F will depend upon the requirements imposed by the situation in which any particular wheel is to be used. For example, as shown in Fig. 1 the back or inner block E is relatively thick with respect to the front or outer block F, while in Fig. 2 is shown an arrangement in which these proportions are reversed. While for most purposes two blocks E and F will be employed to constitute a composite filler member E F, under some circumstances one or the other of these blocks may be omitted, that is to say the filler member E F may lie in the back dish only when very great clearance is wanted between wheel and chassis, or under certain conditions the wood may be fitted in the front dish only, the wood centers being of any required thickness, shape and dimensions to suit the dimensions of hub and gear to be attached to the wheel so as to get the required position of the wheel on its axle or the clearance wanted between the wheel and the chassis; in other words, by making the back wood center E say one inch and a half thick instead of one inch thick, a half inch greater clearance may be obtained between the wheel and chassis, getting the advantage of a dished wheel's clearance without requiring even to dish the spokes and without taking away from the strength of the wheel itself. This enables wheels to be built and standardized in shape and dimensions for the work they have to do with or without a slight dish, and to be easily interchanged with the many different dimensions of existing hubs, drums and gears so that wheels when built under my invention need not become useless as at present because said wheels are not attached to the particular hubs, drums, gears, or chassis, for which said wheels were specially built. I do not confine the use of my renewable wood center E F, to wooden wheels, but may use same in conjunction with suitable wire, metal and other wheels thereby obtaining many advantages which cannot be obtained without it, besides practically floating the various hubs attached on a suitable wood or other elastic center, which center may become practically armor plated when the hub is attached. For example, in Fig. 2 are shown, in place of the wooden spokes C', metal spokes G riveted at their inner ends to the metal center member A b. I may use instead of a wood center any other material which also partially absorbs small road vibrations or shocks between the wheel itself and its axle, without interfering with the interchangeability, detachability, or rigidity of the wheel. With this invention, my retaining metal center A b, with its internal retaining flange A B' whether manufactured a fixed part of my wheel or not may be manufactured in all required shapes and dimensions to suit the many dimensions, constructions and shapes of existing hubs, and gears, for light, heavy, fast or slow traffic. With this invention I am able to build and stock large quantities of my standardized wooden or other wheels making them suitable for practically all kinds of traffic, and attach said wheels easily to all makes of chassis, hubs, drums, and gears, without having the great trouble of requiring to get the particulars and dimensions of chassis, hubs, drums and gears before my actual wheel is built, and with this invention I am able to use many different designs of spokes and fellies, either of wood or metal or a combination of both. The felly and rim construction, however, forms no portion of the invention herein claimed and may be of any usual or well known form.

I claim:

In a wheel of the character described, a dished metal center having a substantially central, inwardly extending flange and two outwardly extending flanges, a series of spokes having their inner ends clamped between the outer flanges of said metal center, a renewable wood center within said metal center and comprising a pair of blocks located at opposite sides of said flange and secured together, said wood center having a central opening, and a hub within said opening and detachably secured to said wood center.

In testimony whereof I affix my signature in presence of two witnesses.

EDWARD BRICE KILLEN.

Witnesses:
JOHN LIDDLE,
JOHN TRAIN LIDDLE.